(12) United States Patent
Wei et al.

(10) Patent No.: US 10,603,635 B2
(45) Date of Patent: Mar. 31, 2020

(54) MULTI-STAGE REVERSE OSMOSIS SYSTEMS AND METHODS

(71) Applicant: Massachusetts Institute of Technology, Cambridge, MA (US)

(72) Inventors: Quantum J. Wei, Cambridge, MA (US); Ronan Killian McGovern, Cambridge, MA (US); John H. Lienhard, V, Lexington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 59 days.

(21) Appl. No.: 15/587,092

(22) Filed: May 4, 2017

(65) Prior Publication Data

US 2017/0320016 A1 Nov. 9, 2017

Related U.S. Application Data

(60) Provisional application No. 62/331,606, filed on May 4, 2016.

(51) Int. Cl.
*B01D 61/02* (2006.01)
*C02F 9/00* (2006.01)
(Continued)

(52) U.S. Cl.
CPC ......... *B01D 61/022* (2013.01); *B01D 61/025* (2013.01); *C02F 1/441* (2013.01);
(Continued)

(58) Field of Classification Search
CPC ............ B01D 2311/14; B01D 2311/16; B01D 2317/022; B01D 2317/06;
(Continued)

(56) References Cited

U.S. PATENT DOCUMENTS 4,265,920 A 5/1981 Thijssen
4,322,448 A 3/1982 Matsuura et al.
(Continued)

FOREIGN PATENT DOCUMENTS

CA 2572410 1/2013
DE 4427478 A1 2/1995
(Continued)

OTHER PUBLICATIONS

GE Osmonics SWRO-200C System Operation & Maintenance Manual, GE Infrastructure Water & Process Technologies. Lenntech. 38 pages, Oct. 10, 2008.
(Continued)

*Primary Examiner* — Pranav N Patel
(74) *Attorney, Agent, or Firm* — Sunstein LLP

(57) ABSTRACT

Improved reverse osmosis (RO) systems include at least first and second stages wherein each stage has at least one RO membrane, each stage has a feed stream inlet, permeate stream outlet, and concentrate stream outlet, the feed stream inlet of the second stage is coupled to the concentrate stream outlet of the first stage, the feed stream entering the first stage is pressurized to a first pressure and the feed stream entering the second stage is pressurized to a second pressure, the second pressure being greater than the first pressure. The systems include M number of reverse osmosis membranes in the first stage and N number of reverse osmosis membranes in the second stage, wherein M≥N. The first pressure and second pressure are configured so that flux of the permeate streams of the first stage and the second stage has a spatial variance that is minimized.

9 Claims, 10 Drawing Sheets

(51) Int. Cl.
*B01D 61/06* (2006.01)
*C02F 1/44* (2006.01)
*B01D 63/12* (2006.01)
*C02F 103/10* (2006.01)
*C02F 103/36* (2006.01)
*C02F 101/12* (2006.01)
*C02F 103/08* (2006.01)

(52) U.S. Cl.
CPC .......... *B01D 63/12* (2013.01); *B01D 2311/14* (2013.01); *B01D 2317/022* (2013.01); *B01D 2317/06* (2013.01); *C02F 2101/12* (2013.01); *C02F 2103/08* (2013.01); *C02F 2103/10* (2013.01); *C02F 2103/365* (2013.01); *C02F 2301/08* (2013.01); *Y02A 20/131* (2018.01)

(58) Field of Classification Search
CPC ............ B01D 2319/022; B01D 61/022; B01D 61/025; B01D 63/12; C02F 1/441; C02F 2103/08; C02F 2301/08
See application file for complete search history.

(56) References Cited

U.S. PATENT DOCUMENTS

| | | | |
|---|---|---|---|
| 4,499,117 A | 2/1985 | Bonneau | |
| 4,532,140 A | 7/1985 | Bonnome | |
| 4,610,887 A | 9/1986 | Galzy et al. | |
| 4,617,127 A | 10/1986 | Light | |
| 4,724,080 A | 2/1988 | Dau et al. | |
| 4,792,402 A | 12/1988 | Fricker | |
| 4,888,189 A | 12/1989 | Gnekow | |
| 4,933,197 A | 6/1990 | Walker et al. | |
| 4,990,350 A | 2/1991 | Rohmann | |
| 4,999,209 A | 3/1991 | Gnekow | |
| 5,403,604 A | 4/1995 | Black, Jr. et al. | |
| 6,187,200 B1 * | 2/2001 | Yamamura ........... | B01D 61/022 210/652 |
| 6,977,092 B2 | 12/2005 | Mantius et al. | |
| 7,455,777 B2 | 11/2008 | Allan | |
| 2004/0238350 A1 | 12/2004 | Takahashi et al. | |
| 2006/0124547 A1 | 6/2006 | Allan | |
| 2006/0254981 A1 | 11/2006 | Efraty | |
| 2010/0047386 A1 | 2/2010 | Tatera | |
| 2012/0006749 A1 | 1/2012 | Said | |
| 2012/0145634 A1 * | 6/2012 | Hooley ................ | B01D 61/022 210/652 |
| 2013/0277310 A1 * | 10/2013 | Okeljas, Jr. ............ | C02F 1/441 210/652 |
| 2014/0360941 A1 * | 12/2014 | Kitamura ............ | B01D 61/022 210/652 |
| 2015/0144559 A1 * | 5/2015 | Taniguchi ............ | B01D 63/106 210/650 |

FOREIGN PATENT DOCUMENTS

| | | |
|---|---|---|
| EP | 2 008 702 A1 | 12/2008 |
| EP | 3 026 104 A1 | 1/2016 |
| GB | 1177126 | 1/1970 |
| GB | 2133418 | 7/1984 |
| WO | WO 92/08783 A1 | 5/1992 |
| WO | WO 03/013704 A2 | 2/2003 |
| WO | WO 08/094367 A1 | 8/2008 |
| WO | WO 11/009950 A1 | 1/2011 |
| WO | WO 2012/033257 A1 | 3/2012 |
| WO | WO 13/016708 AI | 1/2013 |
| WO | WO 13/078020 A1 | 5/2013 |

OTHER PUBLICATIONS

[No Author Listed] Flow Configuration, Hydranautics: High Performance Membrane Products. A Nittoo Denko Corporation, 8 pages, Jan. 23, 2001 http://www.membranes.com/docs/tre/flowcon.pdf.

Branyik, et al., "A Review of Methods of Low Alcohol and Alcohol-Free Beer Production," *J. Food Engin.*, vol. 108, No. 4, pp. 493-506, Sep. 25, 2012.

Bui, et al., "A Reverse Osmosis of the Production of Low Ethanol Content Wine," *Am. J. Enol. Vitic.*, vol. 37, No. 4, pp. 297-300, Jan. 1986.

Greenlee et al., "Reverse osmosis desalination; Water sources, technology, and today's challenges," *Water Research*, vol. 43, pp. 2317-2348, Mar. 18, 2009.

International Searching Authority, Notification of Transmittal of the International Search Report and the Written Opinion of the International Searching Authority, or the Declaration, PCT/US2017/031116, 15 pages, dated Jul. 31, 2017.

International Searching Authority, Preliminary Report on Patentability and Written Opinion for PCT/US2015/027310, dated Nov. 3, 2016, 6 pages.

International Searching Authority, International Search Report and Written Opinion for Application No. PCT/US2015/061006, 3 pages, dated Mar. 16, 2016.

International Searching Authority, International Search Report and Written Opinion for Application No. PCT/US2015/060990, 4 pages, dated Mar. 16, 2016.

International Searching Authority, International Preliminary Report on Patentability for Application No. PCT/US2015/060972, 6 pages, dated Jun. 1, 2017.

International Searching Authority, International Search Report and Written Opinion for Application No. PCT/US2015/060972, 9 pages, dated Mar. 17, 2016.

International Searching Authority, International Search Report and Written Opinion for PCT/US2015/27310, 7 pages, dated Jul. 21, 2015.

Li, C., et al., "Energy Analysis and Efficiency Assessment of Reverse Osmosis Desalination Process," *Desalination*, vol. 276, No. 1, pp. 352-358, Mar. 28, 2011.

Li, W., et al., "A novel hybrid process of reverse electrodialysis and reverse osmosis for low energy seawater desalination and brine management," *Applied Energy*, vol. 104, pp. 592-602, Nov. 27, 2012.

Lu, Y., et al., "Optimum Design of Reverse Osmosis System Under Different Feed Concentration and Product Specification," *Journal of Membrane Science*, vol. 287, No. 2, pp. 219-229, Jan. 15, 2007.

Sassi, K., et al., "Optimal Design and Operation of Reverse Osmosis Desalination Process with Membrane Fouling," *Chemical Engineering Journal*, vol. 171, pp. 582-593, Apr. 19, 2011.

* cited by examiner (b) $A = 10\ \text{L/m}^2\text{-h-bar},\ \bar{J}_{sys} = 30\ \text{L/m}^2\text{-hr}$ (a) $A = 1\ \text{L/m}^2\text{-h-bar},\ \bar{J}_{sys} = 15\ \text{L/m}^2\text{-h}$

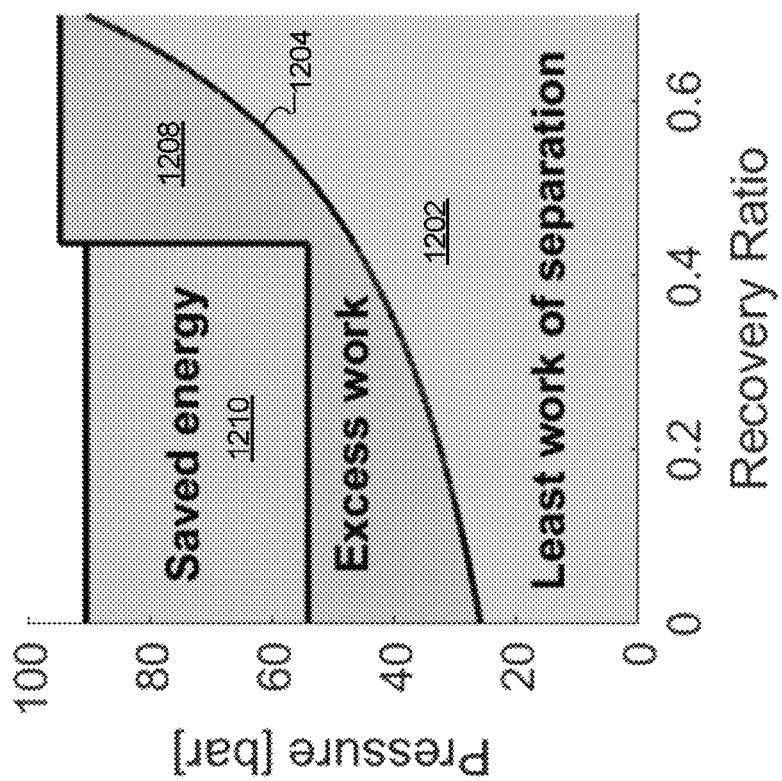
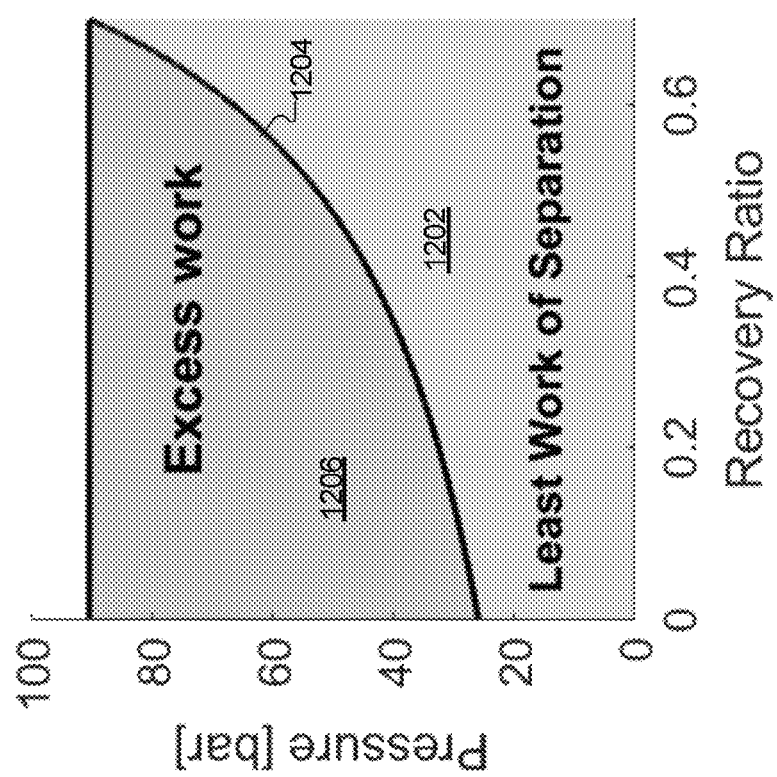
FIG. 12A
FIG. 12B

MULTI-STAGE REVERSE OSMOSIS SYSTEMS AND METHODS

CROSS-REFERENCE TO RELATED APPLICATION

This patent application claims the benefit of U.S. Provisional Patent Application No. 62/331,606 filed May 4, 2016, the disclosure of which is incorporated by reference herein in its entirety.

TECHNICAL FIELD

The present invention relates to reverse osmosis systems and methods of operating same, and more particularly to multi-stage reverse osmosis systems and methods of operating same.

BACKGROUND ART

Water purified in reverse osmosis systems can be costly as compared to, for example, wastewater treatment or importation due the significant energy consumed in operation. Further, the energy consumed in many cases takes the form of burning fossil fuels which brings a further undesirable environmental cost. Benefits of increasing energy efficiency of reverse osmosis systems include greater adoption of these systems and a more effective use of natural resources.

SUMMARY OF THE EMBODIMENTS

In accordance with one embodiment of the present disclosure, an improved reverse osmosis separation system includes at least first and second stages and is of a type wherein (i) each stage has at least one reverse osmosis membrane, (ii) each stage has a feed stream inlet for a feed stream, a permeate stream outlet for a permeate stream, and a concentrate stream outlet for a concentrate stream, (iii) the feed stream inlet of the second stage is coupled to the concentrate stream outlet of the first stage, (iv) the feed stream entering the first stage is pressurized to a first pressure and the feed stream entering the second stage is pressurized to a second pressure, (v) the second pressure is greater than the first pressure, and (vi) pressure exchangers associated with each of the first and second stages are configured to recover energy from the second stage concentrate stream. The improved reverse osmosis separation system includes M reverse osmosis membranes in the first stage and N reverse osmosis membranes in the second stage, wherein M≥N, and the first pressure and second pressure are configured so that spatial variance in flux of the first stage permeate stream relative to flux of the second stage permeate stream is minimized.

In a related embodiment of an improved reverse osmosis separation system, M>N. Optionally, the spatial variance in flux is minimized within an amount equal to 10% of an absolute minimum value of the spatial variance. In yet another related embodiment of an improved reverse osmosis separation system, M≤3N. In another related embodiment of an improved reverse osmosis separation system, M=6 and N=2. In yet another related embodiment of an improved reverse osmosis separation system, M=5 and N=3. Optionally, the type of system, using reverse osmosis membranes configured to have a permeability of approximately 1 L/m$^2$-h-bar, has a first critical recovery ratio $RR_{critical,1}$ under which operation would provide a nominal energy savings over a single-stage reverse osmosis separation system, wherein the type of system, using the reverse osmosis membranes configured to have a permeability of greater than 1.2 L/m$^2$-h-bar, has a second critical recovery ratio $RR_{critical,2}$ less than $RR_{critical,1}$ so as to achieve the nominal energy savings at the second critical recovery ratio $RR_{critical,2}$. In a related embodiment, the type of system, using reverse osmosis membranes configured to have a permeability of greater than 2 L/m$^2$-h-bar, has a third critical recovery ratio $RR_{critical,3}$ less than $RR_{critical,2}$ so as to achieve the nominal energy savings at the third critical recovery ratio $RR_{critical,3}$.

In accordance with another embodiment of the present disclosure, an improved method of operating a reverse osmosis separation system has at least first and second stages and is of a type wherein (i) each stage has at least one reverse osmosis membrane, (ii) each stage has a feed stream inlet for a feed stream, a permeate stream outlet for a permeate stream, and a concentrate stream outlet for a concentrate stream, (iii) the feed stream inlet of the second stage is coupled to the concentrate stream outlet of the first stage, (iv) the feed stream entering the first stage is pressurized to a first pressure and the feed stream entering the second stage is pressurized to a second pressure, (v) the second pressure is greater than the first pressure, and (vi) pressure exchangers associated with each of the first and second stages are configured to recover energy from the second stage concentrate stream. The improved method includes providing M reverse osmosis membranes in the first stage and N reverse osmosis membranes in the second stage, wherein M≥N, and configuring the first pressure and second pressure so that spatial variance in flux of the first stage permeate stream relative to flux of the second stage permeate stream is minimized.

In a related embodiment of an improved method of operating a reverse osmosis separation system, M>N. Optionally, the spatial variance in flux is minimized within an amount equal to 10% of an absolute minimum value of the spatial variance. In another related embodiment of an improved method of operating a reverse osmosis separation system, M≤3N. In yet another related embodiment of an improved method of operating a reverse osmosis separation system, M=6 and N=2. In another related embodiment of an improved method of operating a reverse osmosis separation system, M=5 and N=3.

Optionally, the type of system using reverse osmosis membranes having a permeability of approximately 1 L/m$^2$-h-bar has a first critical recovery ratio $RR_{critical,1}$ under which operation would provide a nominal energy savings over a single-stage reverse osmosis separation system, wherein the improvement further includes configuring the system such that the reverse osmosis membranes have a permeability of greater than 1.2 L/m$^2$-h-bar and that the system has a second critical recovery ratio $RR_{critical,2}$ less than $RR_{critical,1}$ so as to achieve the nominal energy savings at the second critical recovery ratio $RR_{critical,2}$. In a related embodiment, the improvement further includes configuring the system such that the reverse osmosis membranes have a permeability of greater than 2 L/m$^2$-h-bar and that the system has a third recovery ratio $RR_{critical,3}$ less than $RR_{critical,2}$ so as to achieve the nominal energy savings at the third critical recovery ratio $RR_{critical,3}$.

BRIEF DESCRIPTION OF THE DRAWINGS

The foregoing features of embodiments will be more readily understood by reference to the following detailed description, taken with reference to the accompanying drawings, in which:

FIGS. 12A-12B are plots of pressure [bar] as a function of instantaneous recovery ratio within an exemplary single-stage RO system (in FIG. 12A) and an exemplary two-stage RO system (in FIG. 12B) according to embodiments of the present invention.

DETAILED DESCRIPTION OF SPECIFIC EMBODIMENTS

Various embodiments of the present invention provide a reverse osmosis (RO) system and method of operating same. The improved RO system has at least two stages over which feedwater (such as seawater) is filtered to produce freshwater. The operation of two-stage RO system is configured to require less energy than a single-stage system producing a comparable volume of freshwater. Note that, without configuring the system and operation of the two-stage RO system according to embodiments of the present invention, there can be no guarantee of an energy savings over that of the single-stage RO system. Details of illustrative embodiments are discussed below.

Definitions. As used in this description and the accompanying claims, the following terms shall have the meanings indicated, unless the context otherwise requires:

Spatial variance in flux of the first stage permeate stream relative to flux in the second stage permeate stream is "minimized" when the spatial variance is within a designated amount of an absolute minimum of the spatial variance.

Figure 1:
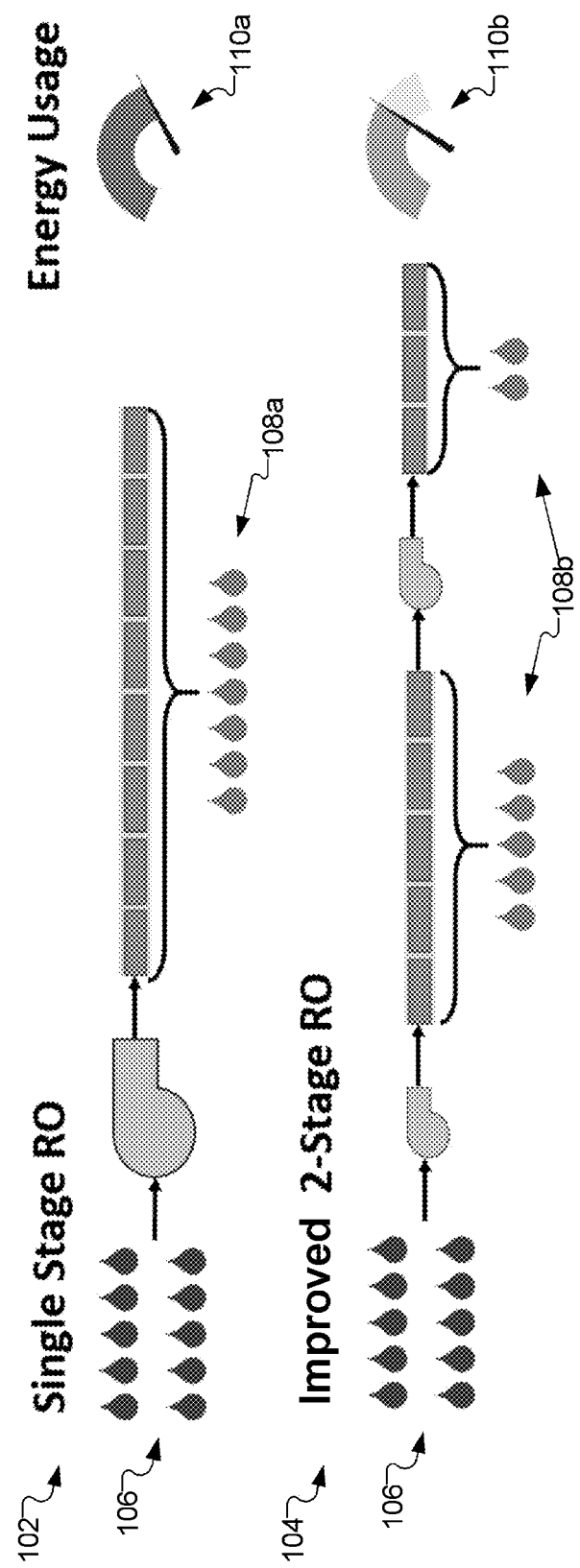
FIG. 1 is a graphic representation of an exemplary single-stage reverse osmosis (RO) system and an exemplary two-stage RO system according to embodiments of the present invention.

"Nominal" energy savings is an amount of energy saved that is sufficient to justify the capital costs associated with building a two-stage RO system over a single-stage RO system FIG. 1 is a graphic representation of an exemplary single-stage RO system 102 and an exemplary two-stage RO system 104 according to embodiments of the present invention. The comparison between the two systems illustrates that, for the same amount of feedwater 106, a two stage RO system 104 can recover a similar amount of permeate or product water 108a, 108b while consuming less energy (as represented by gauges 110a and 110b). In an exemplary embodiment, two features of two-stage RO system can be adjusted: (1) the distribution of RO membranes that make up the membrane area between the stages and (2) feed pressures at each of the stages. In various applications, these two features can be configured in different combinations to achieve energy savings.

Figure 2:
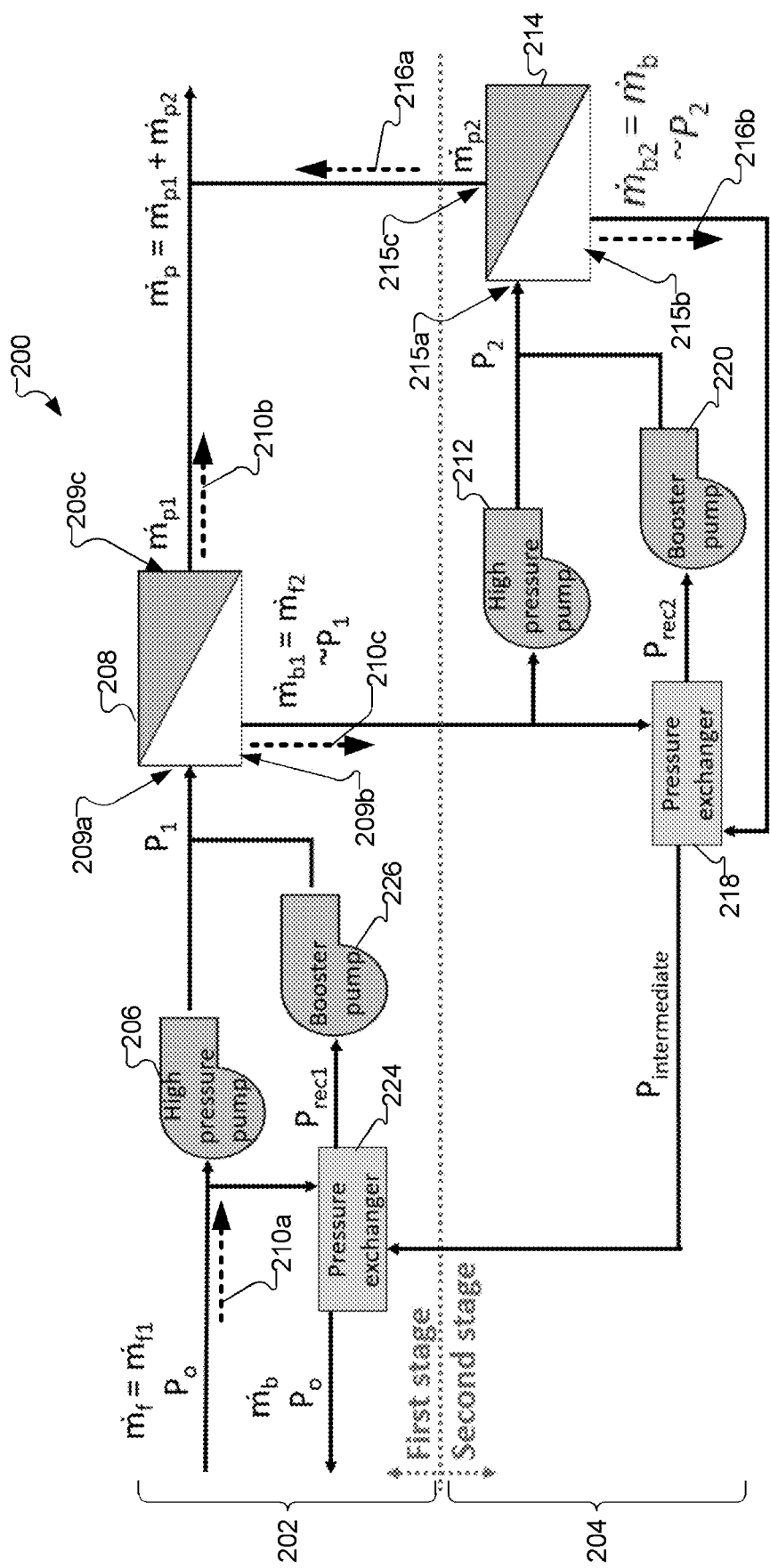
FIG. 2 is a diagram of an exemplary two-stage RO system having a first stage and a second stage according to embodiments of the present invention.

FIG. 2 is a diagram of an exemplary two-stage RO system 200 having a first stage 202 and a second stage 204. Each of the stages 202, 204 includes a pressure vessel having at least one RO membrane, a pressure pump, a booster pump, and a pressure exchanger. In the first stage 202, an initial feed stream 210a, having a mass flow rate $\dot{m}_f = \dot{m}_{f1}$ and an initial pressure $P_0$, is brought to a pressure $P_1$ by a first pressure pump 206 before being fed into a first pressure vessel 208, via a feed stream inlet 209a. The first pressure vessel 208 produces permeate stream 210b (having a mass flow rate $\dot{m}_{p1}$) and concentrate stream 210c (having a mass flow rate $\dot{m}_{b1} = \dot{m}_{f2}$). The permeate stream 210b exits the pressure vessel 208 via a permeate stream outlet 209c. Concentrate stream 210c (having a pressure of approximately $P_1$) exits the pressure vessel 208 via concentrate stream outlet 209b and enters the second stage 204. The concentrate stream 210c is then fed into a feed stream inlet 215a of a second pressure vessel 214, after being brought to pressure $P_2$ by pressure pump 212, producing permeate stream 216a (with mass flow rate $\dot{m}_{p2}$) and concentrate stream 216b (with mass flow rate $\dot{m}_{b2} = \dot{m}_b$). The concentration stream 216b exits the pressure vessel 214 via concentrate stream outlet 215b and the permeate stream 216a exits the pressure vessel 214 via the permeate stream outlet 215c. In this embodiment, the permeate stream 210b from the first stage 202 and permeate stream 216a from the second stage 204 are added together. This combined permeate stream 210b, 216a has a mass flow rate $\dot{m}_p = \dot{m}_{p1} + \dot{m}_{p2}$.

In addition to the above components, a pressure exchanger is used in each stage to extract energy from the second pressurized concentrate stream. The highly pressurized concentrate stream 216b is input to pressure exchanger 218. Relatively low pressure concentrate stream 210b is also input to pressure exchanger 218 and the pressure exchanger equalizes the two pressures. Pressure exchanger 218 then distributes the energy to a portion of the feed stream 210c in the first stage. Due to inefficiencies, a portion of feed streams exit the pressure exchangers 224, 218 at $P_{rec1}$ and $P_{rec2}$, respectively. Pressures $P_{rec1}$ and $P_{rec2}$ are slightly lower than $P_1$ and $P_2$, respectively. Booster pump 220 increases the pressure of feed stream 210c from $P_{rec2}$ to $P_2$. Pressure $P_{intermediate}$ is fed into pressure exchanger 224. Pressure exchanger 224 then distributes the energy to a portion of the feed stream 210a. This portion of the feed stream exits at a pressure $P_{rec1}$ lower than $P_1$ due to inefficiencies in the pressure exchanger 224. Booster pump 226 is used to increase the pressure applied to the feed stream 210a from $P_{rec1}$ to $P_1$.

As mentioned above, one parameter of the RO system is the distribution of the membrane area between the two stages 202 and 204. Pressure vessels 208, 214 may have at least one membrane, for example, in the shape of a spiral wound or hollow fiber RO membrane. In various embodiments, the type of membranes in each pressure vessel is the same for the first and second stages. For example, if the first stage 202 has spiral wound membranes, the second stage 204 also has spiral wound membranes. In some embodiments, a total of eight (8) membranes can be distributed in seven possible configurations between the two stages. Thus, the first stage 202 can have M membranes within the pressure vessel 208 while the second stage 204 has N membranes within the pressure vessel 214, with a combination of M+N membranes. In an exemplary embodiment, M=6 membranes within the pressure vessel 208 in the first stage 202 while N=2 membranes within the pressure vessel 216 in the second stage 204. In another exemplary embodiment, the first stage 202 can have M=5 membranes while the second stage 204 can have N=3 membranes. In yet another exemplary embodiment, the first stage 202 can have M=4 membranes while the second stage 204 has M=4 membranes. In some embodiments, the distribution of membranes is such that M≥N. In some embodiments, the distribution of membranes is such that M>N. In some embodiments, the distribution of the membranes is such that at least half of the total modules M+N is in the first stage. In some embodiments, the distribution of the membranes is such that M is between, and including, N and 3N. In some embodiments, the distribution of the membranes is such that M is between 50% and 75% of the total membranes M+N.

In an exemplary embodiment, two or more pressure vessels can be connected in parallel such that an increased feed stream volume can be accommodated. For example, each stage may include k pressure vessels, where k is a whole number. The pressure vessels in the first stage may each have M membranes while the pressure vessels in the second stage may each have N membranes so that the total number of membranes in the first stage is k*M and the total number of membranes in the second stage is k*N. In various embodiments, the above described relationships apply to systems having a parallel pressure vessel configuration. For example, the system 200 may have k pressure vessels 208 and 214 in which the first stage 202 has k*M=k*6 membranes while the second stage 204 has k*N=k*2 membranes. In another example, the distribution of membranes for a parallel pressure vessel configuration is k*M≥k*N. In yet another example, the distribution of membranes for a parallel pressure vessel configuration is k*M>k*N. In another example, the distribution of the membranes is such that at least half of the total modules k*(M+N) is in the first stage. In yet another example, the distribution of the membranes is such that k*M is between, and including, k*N and k*3N. In another example, the distribution of the membranes is such that k*M is between 50% and 75% of the total membranes k*(M+N).

In an exemplary embodiment, two or more pressure vessels can be connected in parallel such that an increased feed stream volume can be accommodated. For example, the first stage may include k pressure vessels, where k is a whole number. The second stage may include l pressure vessels, where l is a whole number. For example, the first stage may have great number of vessels than the second stage, thus k>l. The pressure vessels in the first stage may each have M membranes while the pressure vessels in the second stage may each have N membranes. In various embodiments, the above described relationships apply to systems having a parallel pressure vessel configuration. For example, the system 200 may have k pressure vessels 208 and 214 in which the first stage 202 has k*M=k*6 membranes while the second stage 204 has l*N=l*2 membranes. In another example, the distribution of membranes for a parallel pressure vessel configuration is k*M≥l*N. In yet another example, the distribution of membranes for a parallel pressure vessel configuration is k*M>l*N. In another example, the distribution of the membranes is such that at least half of the total modules k*(M+N) is in the first stage.

Another parameter of the two-stage RO system is the amount of permeate stream produced at each stage, the permeate stream amount being a function of the feed pressure. In some embodiments, the feed pressures at each of the stages can be configured such that the spatial variance of the permeate flux in the system is minimized. In some embodiments, the spatial variance in flux is minimized within a designated amount equal to 10% of an absolute minimum value of the spatial variance. In some embodiments, the spatial variance in flux is minimized within a designated amount equal to 20% of an absolute minimum value of the spatial variance. In some embodiments, the spatial variance in flux is minimized within a designated amount equal to 5% of an absolute minimum value of the spatial variance. In some embodiments, the spatial variance in flux is minimized to the absolute minimum value of the spatial variance.

In an exemplary embodiment, the two-stage RO system can filter seawater with salt mass fraction $w_{s,f}=35$ g/kg. The exemplary system has eight (8) total membranes, a membrane permeability A=1 L/m²-h-bar, and system flux $J_{sys}=15$ L/m²-h. The exemplary system can operate at a recovery ratio (RR)=0.7. The flux distribution of the two-stage system can be measured in terms of the permeate flux in the first stage normalized by the system flux:

$$\bar{J}_{1,norm} = \frac{\bar{J}_1}{J_{sys}}.$$

When the first-stage feed pressure $P_1$ is at its lowest value ($\pi_f$) and the second-stage feed pressure $P_2$ is at its highest value, permeate flux $\bar{J}_{1,norm}=0$ and the first stage of the RO system produces no permeate. In some embodiments, the foregoing configuration results in a greater energy consumption than a single-stage RO system due to the high second-stage feed pressure requirement. When $\bar{J}_{1,norm}=1$, permeate flux is balanced between the first and second stages. When the first-stage feed pressure is at its highest value and the second-stage feed pressure is at its lowest value ($\pi_b$), permeate flux $\bar{J}_{1,norm}$ is at its maximum value and all permeate is produced in the first stage.

Figure 3A:
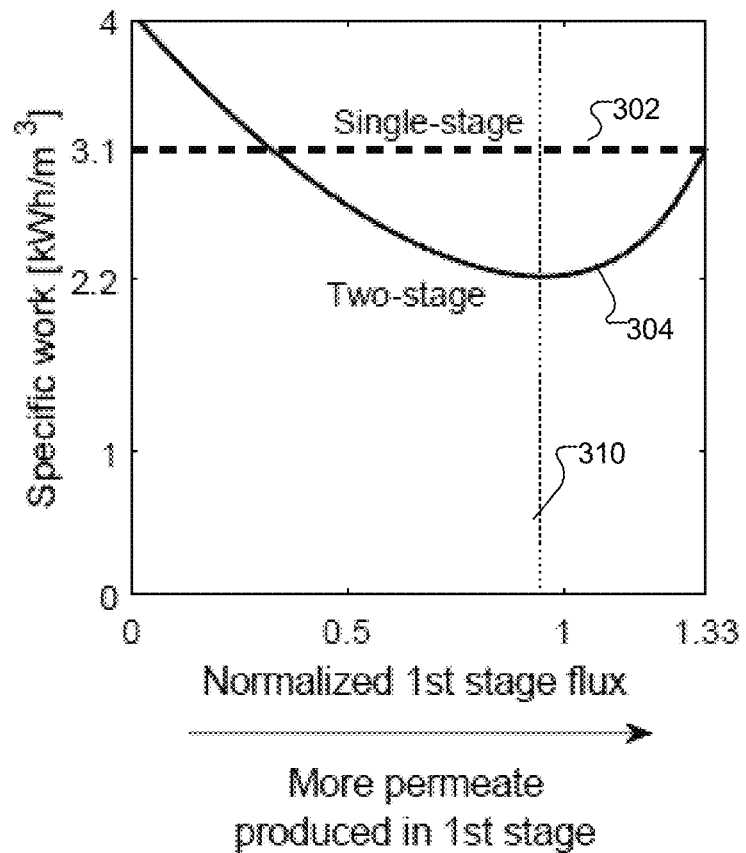
FIGS. 3A-3B illustrate the effect of first-stage and second-stage feed pressures on the energy consumption of an exemplary two-stage RO system (in which M=6, N=2) according to embodiments of the present invention.
Figure 3B:
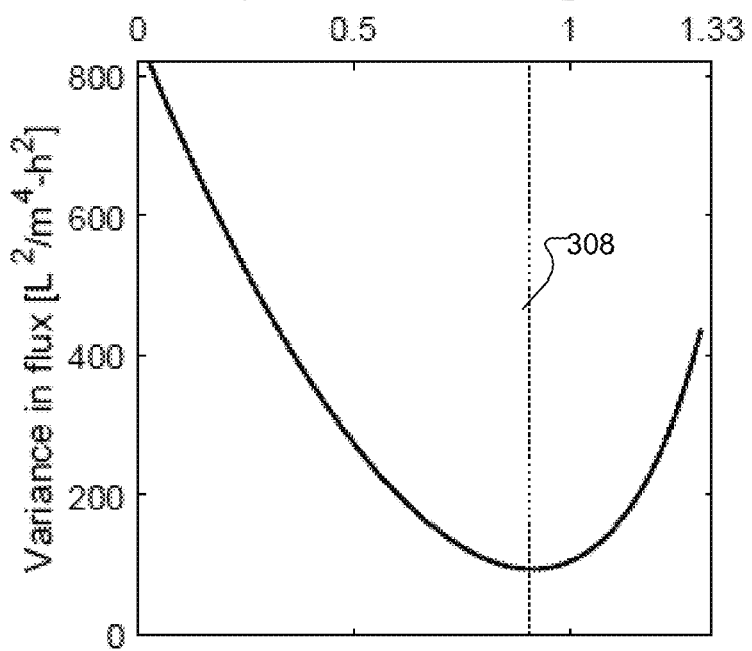

FIGS. 3A-3B illustrate the effect of first-stage and second-stage feed pressures on the energy consumption of an exemplary two-stage RO system in which M=6, N=2. As first-stage feed pressure is increased and second-stage feed pressure is decreased, more permeate is produced in the first stage (and less in the second stage). FIG. 3A is a plot of the specific work (in kWh/m³) as a function of normalized first stage permeate flux (in non-dimensional units) for a single-stage RO system (dotted line 302) and a two-stage RO system (solid line 304). The normalized first stage permeate flux is the first stage flux normalized by the overall system flux. The two-stage RO system consumes more energy at lower flux (at approximately less than 0.35) than a single stage RO system. However, the two-stage RO system consumes lower energy than the single-stage RO system at a flux of approximately 0.35-1.33. In this example, the lowest energy consumed is at a flux of approximately 0.90.

FIG. 3B is a plot showing the variance (in $L^2/m^4\text{-}h^2$) in permeate flux as a function of normalized first stage flux for the exemplary two-stage RO system in which M=6, N=2. The minimum of the variance (denoted by line 308) occurs approximately at the lowest energy consumption, as denoted by line 310. The lines 308 and 310 may not be perfectly coincident due to the effects of concentration polarization (or reduced permeate flux due to increased salt concentration on the membrane surface relative to the bulk feed). In some embodiments, the spatial variance in flux is minimized to the minimum value of the spatial variance denoted by line 308 or to a designated amount of the minimum value of the spatial variance denoted by line 308. In addition to the benefits in energy consumption, the exemplary two-stage RO system has decreased maximum fluxes as compared to the single-stage system. In a general RO system, maximum flux occurs at the beginning of the system when the difference between the feed pressure and osmotic pressure is largest. In an exemplary two-stage RO system, the maximum difference between feed pressure and osmotic pressure should be smaller than that of a single-stage system with the same number of membranes and producing similar amounts of freshwater.

Figure 4:
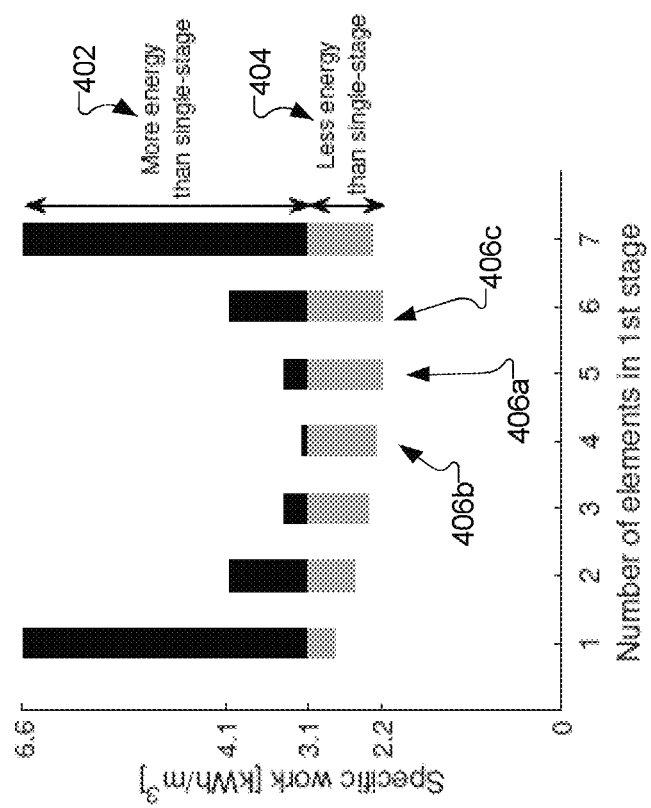
FIG. 4 is a plot showing the specific work [kWh/m$^3$]—or energy consumption—as a function of the number of membranes in the first stage of an exemplary two-stage RO system.

FIG. 4 is a plot showing the specific work [kWh/m³]—or energy consumption—as a function of the number of membranes in the first stage of an exemplary two-stage RO system having eight (8) membranes, system flux ($\bar{J}_{sys}$=15 L/m²·h), membrane permeability (A=1 L/m²·h·bar), feed salinity ($w_{s,f}$=35 g/kg), and recovery ratio (RR=0.7). The dark bars 402 indicate greater energy consumption than a corresponding single-stage system and the lighter gray bars 404 indicate lower energy consumption than the corresponding single-stage system. Two-stage systems can be improved with five membranes 406a in the first stage with the lowest energy consumption (at 2.20 kWh/m³) though similar consumptions are possible with a first stage having either four membranes 406b (with energy consumption of 2.21 kWh/m³) or six membranes 406c (with energy consumption of 2.26 kWh/m³). Table 1 below details minimum specific energy consumption (SEC) of different membrane configurations of the RO systems. Note that the two-stage system achieves lower minimum SEC for all membrane configurations as compared to the single-stage RO system.

Figures 5A, 5B:
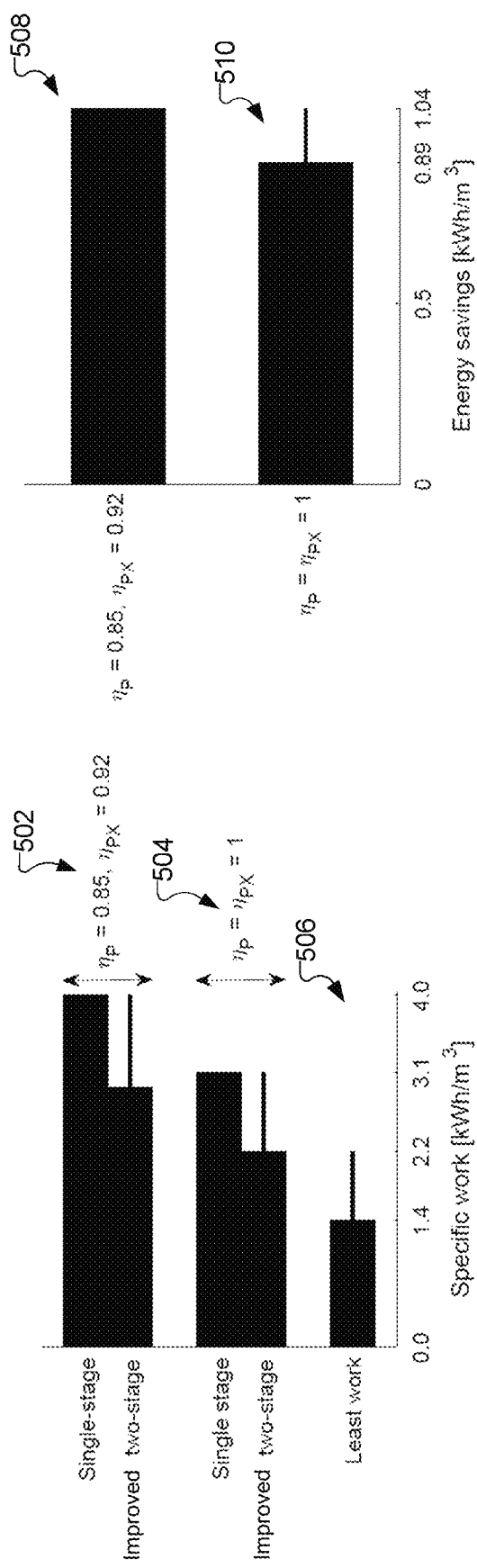
FIG. 5A is a plot showing the savings in work for realistic single-stage and two-stage; ideal single-stage and two-stage; and least work of separation.
FIG. 5B is a plot showing exemplary energy savings between a single-stage RO system and a two-stage RO system according to embodiments of the present invention.

In the exemplary system comparison above (with a realistic pump efficiency $\eta_P$=0.85 and pressure exchanger efficiency $\eta_P$=0.92), there is an energy savings of approximately 1.04 kWh/m³ (or 26.3%). In an exemplary embodiment of an "ideal" system with 100% efficiencies, switching to a two-stage system according to embodiments of the present invention reduces energy consumption by 0.89 kWh/m³ (28.6% savings). This is 53.3% of the potential savings, which is the difference between the single-stage energy consumption and the thermodynamic least work of separation. FIG. 5A is a plot showing the savings in work for realistic single-stage and two-stage RO system 502; ideal single-stage and two-stage RO system 504; and least work of separation 506. In some embodiments, further energy savings may be achieved by adding a third stage, a fourth stage, and so on. However, in some of these embodiments, the energy savings may decrease with each added stage and/or the capital investment may prove too high to warrant additional stages.

FIG. 5B is a plot showing exemplary energy savings between a single-stage RO system and a two-stage RO system, the savings being large in the realistic case 508 as compared to the ideal case 510. If all pumps in the systems have the same efficiency, then the rate of work saved by moving from a single-stage RO system to a two-stage RO system is given by:

$$\Delta \dot{W}_{1S \to 2S} = \frac{PQ_f\mid_{1S} - P_2 Q_f \mid_{2S} + (P_2 - P_1) Q_{p1} \mid_{2S}}{\eta_P}$$

where $Q_f$ is the volumetric flow rate of the initial feed stream and $Q_{p1}$ is the volumetric flow rates of the permeate produced in the first-stage of a two-stage RO system. If the single-stage and two-stage RO systems have equal membrane area, average system flux, and recovery ratio, then the flow rates of a single-stage and two-stage feed streams equal one another: $Q_{f,1S}$=$Q_{f,2S}$. In the improved two-stage RO system, the feed pressure of the second stage of the two-stage system equals the feed pressure of a single-stage system: $P_{2,2S} \approx P_{1S}$. In such a case, the rate of work (corresponding to energy) saved is approximately:

$$\Delta \dot{W}_{1S \to 2S} \approx \frac{(P_2 - P_1) Q_{p1} \mid_{2S}}{\eta_P}$$

In some embodiments, energy is saved in the two-stage RO system because the permeate stream produced in the first stage is not raised to the second-stage feed pressure but to

TABLE 1

Minimum SEC for two-stage and single stage RO systems, each having the same total number of membranes (8), system flux ($\bar{J}_{sys}$ = 15 L/m² · h), membrane permeability (A = 1 L/m² · h · bar), feed salinity ($w_{s,f}$ = 35 g/kg NaCl), and recovery ratio (RR = 0.7).

|  | Two-stage # of membranes in 1st stage | | | | | | | Single-stage |
| --- | --- | --- | --- | --- | --- | --- | --- | --- |
|  | 1 | 2 | 3 | 4 | 5 | 6 | 7 | 8 |
| Minimum SEC [kWh/m3] | 2.78 | 2.53 | 2.36 | 2.26 | 2.20 | 2.21 | 2.33 | 3.09 | the first-stage feed pressure, resulting in less overall energy consumption. The decision to add a second stage to a RO system is simplified when the energy savings outweigh the cost of adding the second stage.

In some embodiments, energy savings from adding a second stage increase as the recovery ratio increases. This result can occur because more energy is available in a system with a greater recovery ratio. However, the least work of separation also rises with recovery ratio. Following this logic leads to the notion that more energy can be saved by adding a stage when the least work of separation is large. Table 2 below illustrates that a single-stage brackish water RO system operating at RR=0.7 consumes less energy than a two-stage system at RR=0.9. However, energy savings can be increased by adding a second stage at higher recovery ratios (such as RR=0.9) as compared to lower recovery ratios (such as at RR=0.8 or 0.7).

TABLE 2

Energy consumptions of single-stage and two-stage RO systems as compared to recovery ratios and salinity.

|  | Brackish water | | | Seawater | | | Produced Water | | |
| --- | --- | --- | --- | --- | --- | --- | --- | --- | --- |
| Salinity [g/kg NaCl] | 3 | | | 35 | | | 95 | | |
| Recovery ratio | 0.9 | 0.94 | 0.98 | 0.4 | 0.6 | 0.8 | 0.2 | 0.4 | 0.6 |
| Least work [kWh/m$^3$] | 0.17 | 0.20 | 0.26 | 1.02 | 1.24 | 1.71 | 2.74 | 3.27 | 4.21 |
| Single-stage SEC [kWh/m$^3$] | 0.71 | 1.15 | 4.33 | 1.58 | 2.20 | 5.41 | 3.435 | 4.69 | 8.85 |
| Two-stage SEC [kWh/m$^3$] | 0.63 | 0.69 | 1.01 | 1.52 | 1.85 | 3.00 | 3.314 | 4.08 | 6.08 |
| Energy savings [kWh/m$^3$] | 0.08 | 0.47 | 3.32 | 0.06 | 0.35 | 2.41 | 0.121 | 0.61 | 2.77 |

Figure 6:
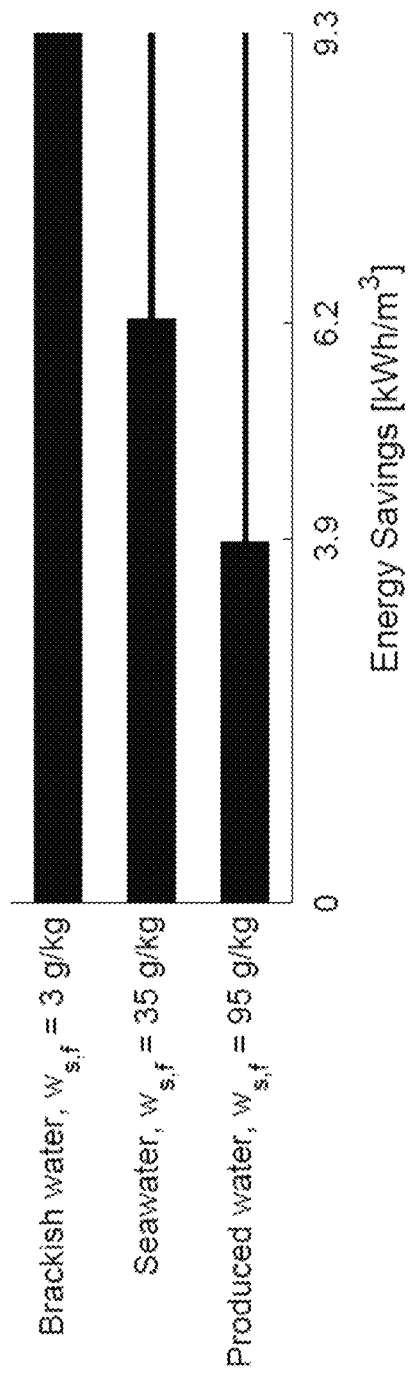
FIG. 6 is a plot illustrating the maximum energy savings achievable in a two-stage RO system for brackish water, seawater, and produced water (in order of increasing salinity) according to embodiments of the present invention.

FIG. 6 is a plot illustrating the maximum energy savings achievable in a two-stage RO system for brackish water, seawater, and produced water (in order of increasing salinity). The energy savings are greatest for the brackish water feed, especially when taken to NaCl saturation in the concentrate stream. "NaCl saturation" refers to the solubility of NaCl in water, which is 359 g/L. The variation in osmotic pressure it is greater than if seawater or produced water is taken to saturation. The opportunity to save energy in a two-stage system increases with variation in osmotic pressure π. It is very energy inefficient to take a brackish water feed all the way to NaCl saturation with a single-stage system. In this case, the entire feed stream needs to be pressurized to the osmotic pressure at saturation. On the other hand, very little energy is saved for recovery ratio RR=0.9 for brackish water feed. In comparison, greater energy savings can be found for produced water at RR=0.6.

Figure 7:
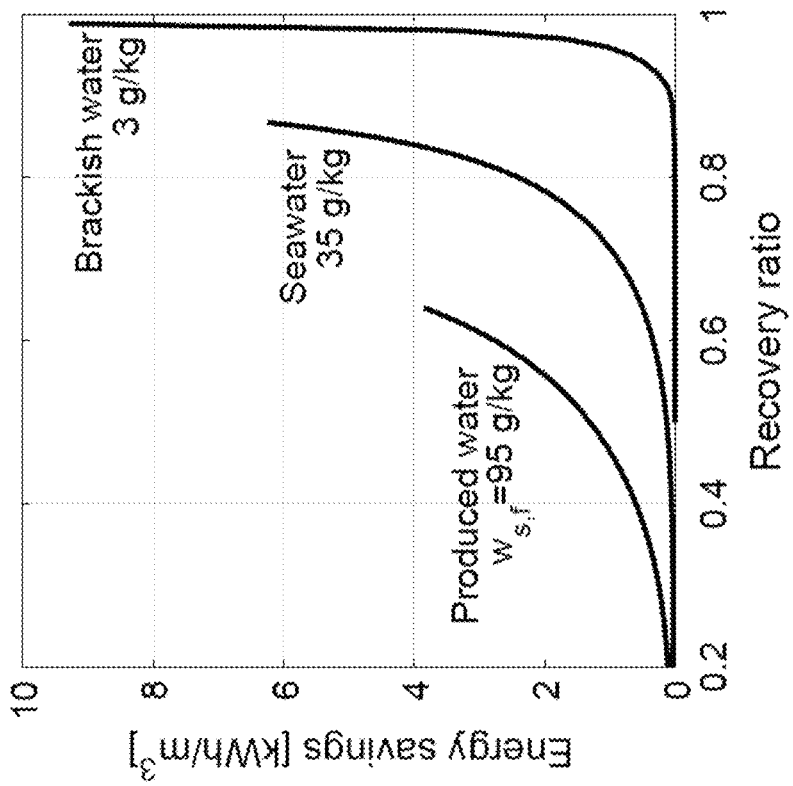
FIG. 7 is a plot illustrating exemplary energy savings as a function of recovery ratios for a two-stage RO system having three different feed salinities according to embodiments of the present invention.

FIG. 7 is a plot illustrating exemplary energy savings as a function of recovery ratios for a two-stage RO system having three different feed salinities (produced water at 95 g/kg NaCl; seawater at 35 g/kg NaCl; and brackish water at 3 g/kg NaCl). The plot shows that brackish water should be taken to high recovery ratios if energy savings are expected as compared to produced water.

Figure 8:
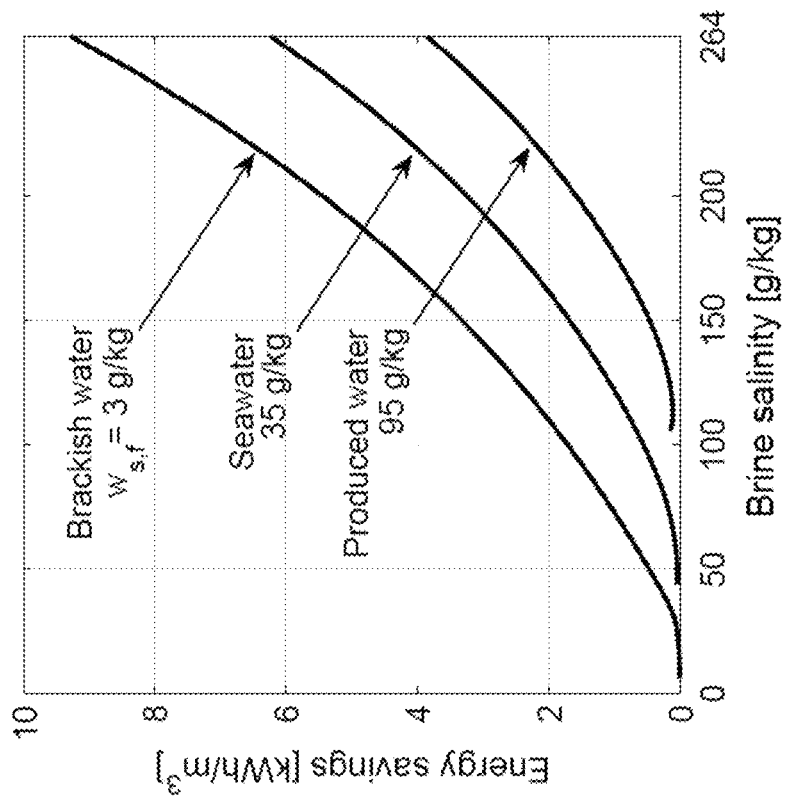
FIG. 8 is a plot illustrating exemplary energy savings as a function of concentrate salinity for each of the three different feed salinities described in FIG. 7.

FIG. 8 is a plot illustrating exemplary energy savings as a function of concentrate salinity for each of the three different feed salinities described in FIG. 7. The greatest energy savings are achieved at low feed salinity, such as for brackish water, as compared to the high feed salinity.

Figure 9:
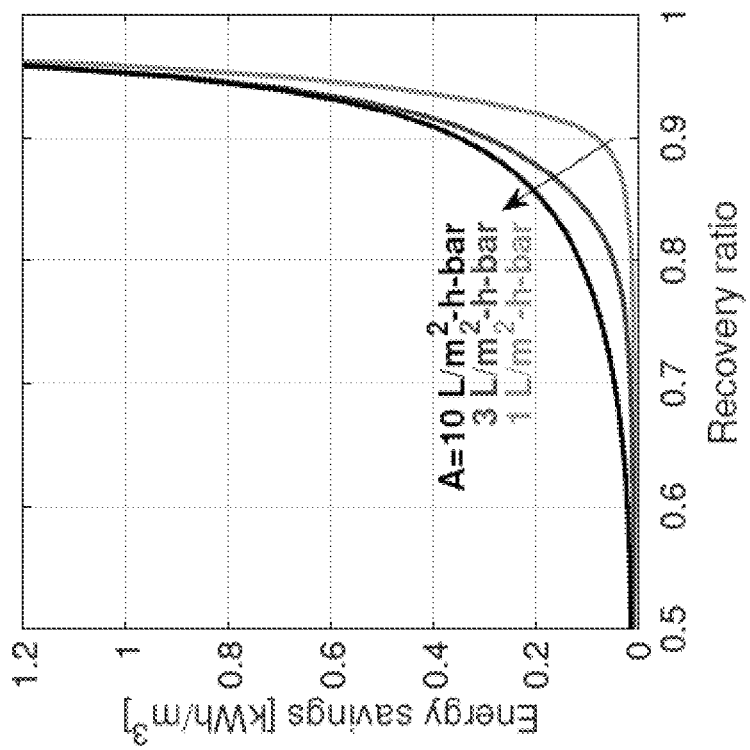
FIG. 9 is a plot illustrating exemplary energy savings as a function of recovery ratios and membrane permeabilities for a two-stage RO system according to embodiments of the present invention.

FIG. 9 is a plot illustrating exemplary energy savings as a function of recovery ratios and membrane permeabilities for a two-stage RO system. A typical membrane permeability may be 1 L/m$^2$-h-bar as compared to a high permeability at 3 or 10 L/m$^2$-h-bar. The energy savings are approximately equal for the different membrane permeabilities when recovery ratio is very low (less than 0.5) or very high (0.95). In some embodiments, greater membrane permeability results in slightly higher energy savings. For example, each reverse osmosis membrane can be configured to have permeability of greater than 1.2 L/m$^2$-h-bar to achieve greater than nominal energy savings at a particular recovery ratio. In some embodiments, each reverse osmosis membrane can be configured to have permeability of greater than 2 L/m$^2$-h-bar to achieve further energy savings at the recovery ratio.

In some embodiments, for the type of two-stage RO system using reverse osmosis membranes having a permeability of approximately 1 L/m$^2$-h-bar, there is a critical or threshold recovery ratio $RR_{critical}$. Operation at recovery ratios less than $RR_{critical}$ would not provide enough energy savings over a single-stage system to justify the additional capital costs of the two-stage system. In a related embodiment, $RR_{critical}$ would be lower for the type of two-stage system using reverse osmosis membranes configured to have a permeability of greater than 2 L/m$^2$-h-bar.

For example, for a high-salinity feed stream (95 g/kg), implementing an improved two-stage RO system at recovery ratio RR=0.4 with membranes having permeability of 1 L/m$^2$-h-bar can result in an energy savings of 0.63 kWh/m$^3$ relative to a single-stage RO system. A similar two-stage RO system (having salinity 95 g/kg and a recovery ratio RR=0.4) with higher permeability membranes (2 L/m$^2$-h-bar) can increase the energy savings relative to a single-stage RO system to 0.78 kWh/m$^3$. A similar two-stage RO system (having salinity 95 g/kg and a recovery ratio RR=0.4) with further increase in membrane permeability (3 L/m$^2$-h-bar) can increase the energy savings relative to a single-stage RO system to 0.81 kWh/m$^3$.

Figure 10:
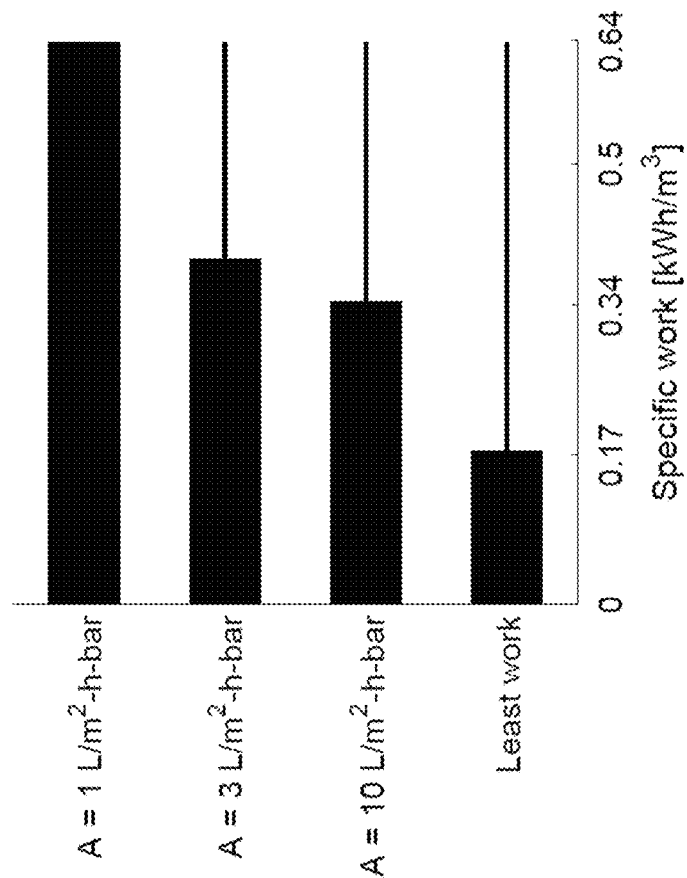
FIG. 10 is a plot illustrating specific work as a function of different membrane permeabilities associated with an exemplary two-stage brackish water RO system according to embodiments of the present invention.

FIG. 10 is a plot illustrating specific work as a function of different membrane permeabilities associated with an exemplary two-stage brackish water RO system having eight (8) membranes, system flux ($J_{sys}$=15 L/m$^2$-h), feed salinity ($w_{s,f}$=3 g/kg), and recovery ratio (RR=0.91) as compared to least work of separation at RR=0.91. Note that increasing membrane permeability from 3 to 10 L/m$^2$-h-bar does not significantly increase energy savings. In some embodiments, at very high membrane permeabilities, concentration polarization becomes the dominant resistance to permeate flux. Thus, an increase in membrane permeability of up to A=3 L/m$^2$-h-bar can somewhat increase the saved energy. Table 3 provides energy savings data for each of the membrane permeabilities and recovery ratios for a two-stage brackish water RO system as compared to a single-stage brackish water RO system. Energy savings are small at low recovery ratios because energy consumption is already low for higher membrane permeabilities. At high recovery ratios, energy savings do not vary much since the energy needed for over-pressurization is small as compared to the least work of separation. In some embodiments, membranes with higher permeabilities may slightly increase the energy saved for two-stage RO systems at moderate recovery ratios. The benefits of increased membrane permeability appear to be more significant at lower recovery ratios.

TABLE 3

Energy savings in a two-stage brackish water RO system as a function of recovery ratios and membrane permeabilities.

| | Recovery ratio | | | |
|---|---|---|---|---|
| | 0.60 | 0.84 | 0.91 | 0.98 |
| Least work [kWh/m$^3$] | 0.10 | 0.14 | 0.17 | 0.25 |
| Energy savings [kWh/m$^3$] for A = 1 L/m$^2$-h-bar | 0.01 | 0.02 | 0.12 | 3.32 |
| Energy savings [kWh/m$^3$] for A = 3 L/m$^2$-h-bar | 0.01 | 0.10 | 0.36 | 3.40 |
| Energy savings [kWh/m$^3$] for A = 10 L/m$^2$-h-bar | 0.02 | 0.17 | 0.40 | 3.40 |

Figures 11A, 11B:
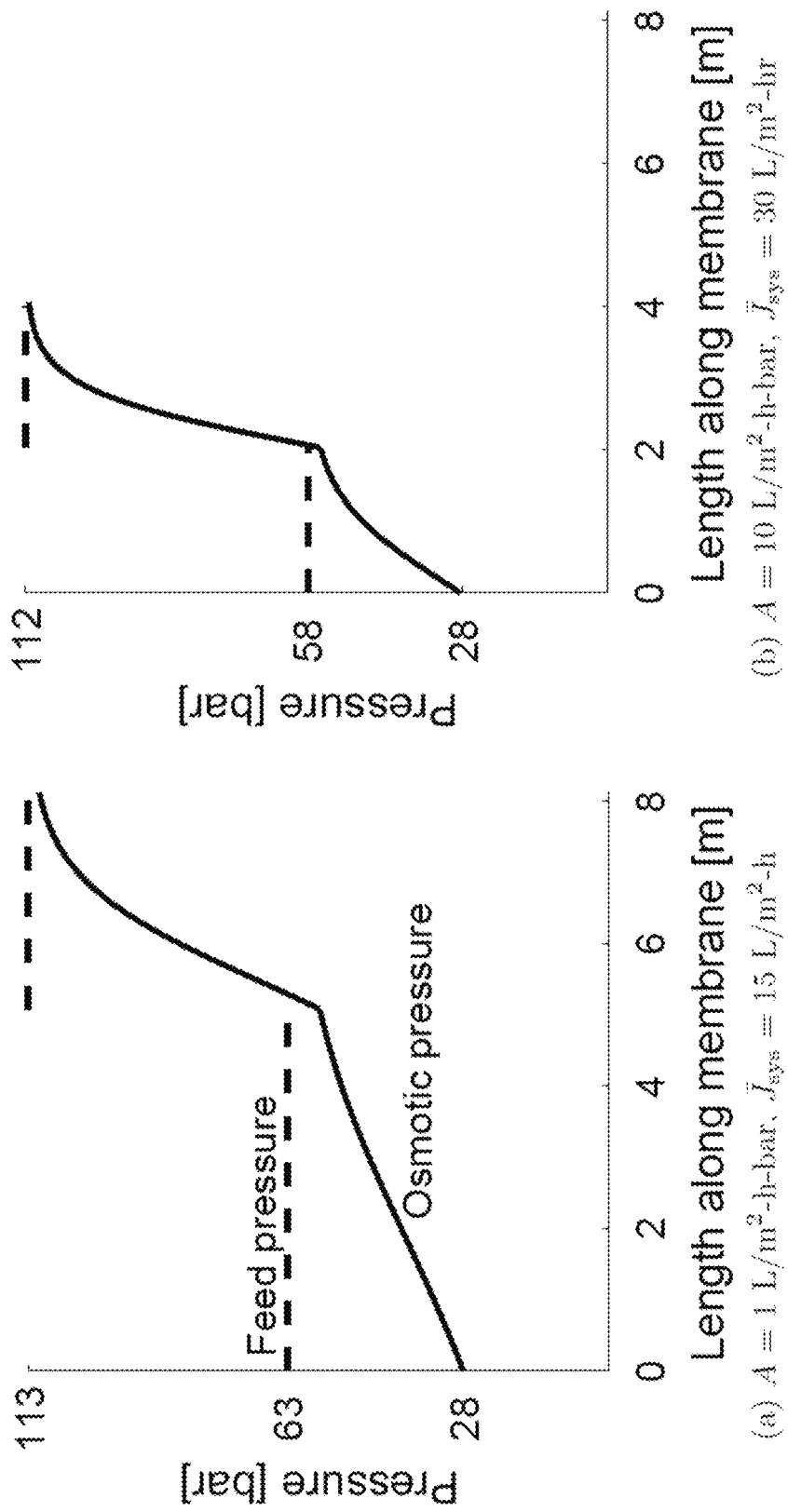
FIGS. 11A-11B are plots of feed and osmotic pressures [bar] as functions of membrane length [m] for an exemplary two-stage RO system with typical membrane permeability (FIG. 11A) and an exemplary two-stage RO system with high membrane permeability (FIG. 11B) according to embodiments of the present invention.

FIGS. 11A-11B are plots of feed and osmotic pressures [bar] as functions of membrane length [m] for an exemplary two-stage RO system with typical membrane permeability A=1 L/m$^2$-h-bar and system flux $\bar{J}_{sys}$=15 L/m$^2$-h (shown in FIG. 11A) and an exemplary two-stage RO system with high membrane permeability A=10 L/m$^2$-h-bar and system flux $\bar{J}_{sys}$=30 L/m$^2$-h (shown in FIG. 11B). The RO system having the higher membrane permeability can produce the same amount of freshwater in half the membrane area (using four instead of eight membranes). Further, less energy (2.12 compared to 2.20 kWh/m$^3$) is used to produce the freshwater for the system having the higher permeability membrane. Thus, while increased permeability can lead to cost savings by decreasing overall size of the RO system, the energy savings may not be substantial as compared to improving other features of the two-stage RO system.

FIGS. 12A-12B are plots of pressure [bar] as a function of instantaneous recovery ratio within an exemplary single-stage RO system (in FIG. 12A) and an exemplary two-stage RO system (in FIG. 12B), both having system flux $\bar{J}_{sys}$=15 L/m$^2$-h. The outlined areas of the plots correspond to energy consumption. Recovery ratio is proportional to the energy consumed in pressurizing the permeate flow. In FIG. 12A, area 1202 (under osmotic pressure curve 1204) corresponds to energy consumed for the least work of separation and area 1206 (above curve 1204) corresponds to excess energy consumed in the single-stage RO system. In FIG. 12B, the least work area 1202 stays approximately equal to that of the single-stage RO system. In contrast to the single-stage RO system, the excess work (area 1208) required in the two-stage RO system is reduced (by the saved energy area 1210).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An improved method of operating a reverse osmosis separation system, the system having a first stage and a second stage, the first and second stages each having (i) at least one reverse osmosis membrane, and (ii) a feed stream inlet for a feed stream, a permeate stream outlet for a permeate stream, and a concentrate stream outlet for a concentrate stream, wherein the feed stream inlet of the second stage is coupled to the concentrate stream outlet of the first stage, the feed stream entering the first stage is pressurized to a first pressure and the feed stream entering the second stage is pressurized to a second pressure, and the second pressure is greater than the first pressure, wherein the improvement comprises:
   providing M number of reverse osmosis membranes in the first stage and N number of reverse osmosis membranes in the second stage, wherein M>N;
   providing a first pressure exchanger that is fluidically coupled to (a) the concentrate stream of the first stage, (b) the concentrate stream of the second stage, and (c) a first booster pump, the first booster pump being fluidically coupled to the feed stream of the second stage;
   providing a second pressure exchanger that is fluidically coupled to the first pressure exchanger and fluidically coupled to a second booster pump, the second booster pump being fluidically coupled to the feed stream of the first stage; and
   configuring the first pressure and the second pressure so that flux of the permeate streams of the first stage and the second stage has a spatial variance that is minimized.

2. An improved method of operating a reverse osmosis separation system according to claim 1, wherein M>N.

3. An improved method of operating a reverse osmosis separation system according to claim 1, wherein the spatial variance within a designated amount of a minimum value of the spatial variance.

4. An improved method of operating a reverse osmosis separation system according to claim 2, wherein M<3N.

5. An improved method of operating a reverse osmosis separation system according to claim 2, wherein M=6 and N=2.

6. An improved method of operating a reverse osmosis separation system according to claim 2, wherein M=5 and N=3.

7. An improved method of operating a reverse osmosis separation system according to claim 1, the method further comprising:
   configuring the system such that the reverse osmosis membranes have a permeability of greater than 1.2 L/m$^2$-h-bar.

8. An improved method of operating a reverse osmosis separation system according to claim 1, the method further comprising:
   configuring the system such that the reverse osmosis membranes have a permeability of greater than 2 L/m$^2$-h-bar.

9. An improved method of operating a reverse osmosis separation system according to claim 1, the method further comprising configuring the system to have a permeability of approximately 1 L/m$^2$-h-bar.

* * * * *

UNITED STATES PATENT AND TRADEMARK OFFICE
CERTIFICATE OF CORRECTION

PATENT NO. : 10,603,635 B2
APPLICATION NO. : 15/587092
DATED : March 31, 2020
INVENTOR(S) : Quantum J. Wei et al.

It is certified that error appears in the above-identified patent and that said Letters Patent is hereby corrected as shown below:

In the Claims

Column 12, Line 40:
$M<3N$ should be $M\leq 3N$

Signed and Sealed this
Ninth Day of June, 2020

Andrei Iancu
*Director of the United States Patent and Trademark Office*